C. H. DIETZ.
CLINICAL THERMOMETER.
APPLICATION FILED MAR. 27, 1912.
1,152,153.
Patented Aug. 31, 1915.
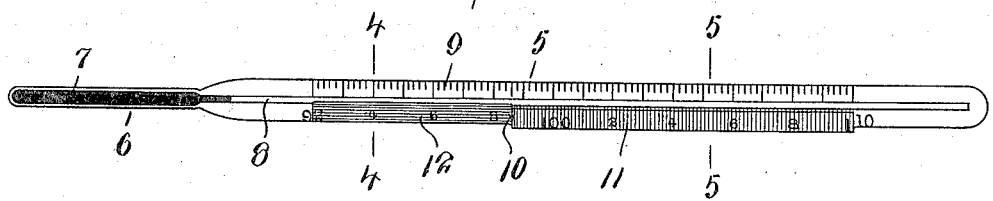
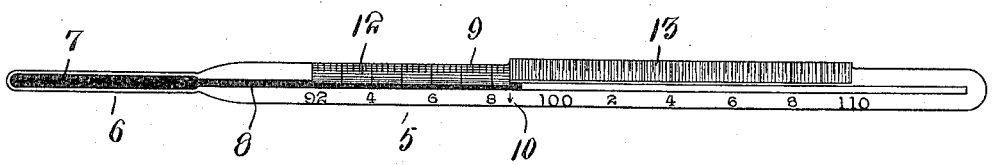
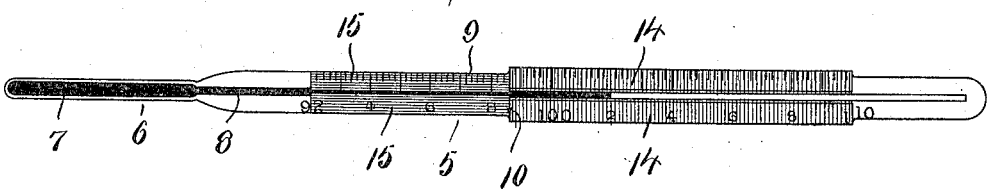
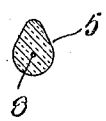
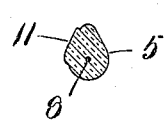
Inventor
Charles H. Dietz
By Victor J. Evans
Attorney
Witnesses

UNITED STATES PATENT OFFICE.

CHARLES HENRY DIETZ, OF ST. LOUIS, MISSOURI.

CLINICAL THERMOMETER.

1,152,153.  Specification of Letters Patent.  Patented Aug. 31, 1915.

Application filed March 27, 1912. Serial No. 686,504.

*To all whom it may concern:*

Be it known that I, CHARLES HENRY DIETZ, a citizen of the United States, residing at St. Louis, in the State of Missouri, have invented new and useful Improvements in Clinical Thermometers, of which the following is a specification.

The invention relates to a thermometer and more particularly to the class of clinical or fever thermometers.

The primary object of the invention is the provision of a thermometer in which the mercurial column is partially obliterated or obscured for a predetermined distance in a scale while the remaining portion is magnified thereby enabling a person unskilled in the reading of this class of thermometers to determine with accuracy instantaneously on glancing at the thermometer the fever degree in the magnifying field of the thermometer.

Another object of the invention is the provision of a clinical thermometer of this character wherein a magnifying field exists thereon from a given point for instance normal temperature point throughout the supernormal field of said thermometer so that the mercurial thread can be accurately determined at any point of travel thereof in the supernormal field for the instantaneous reading of fever temperature on the thermometer.

A further object of the invention is the provision of a thermometer in which the construction thereof insures correct readings, the portion of the scale indicating abnormal temperature being marked throughout the area thereof for visually distinguishing the said abnormal portion from the subnormal portion exclusively of the indicating elements of the scale ordinarily placed upon one face or side of the said thermometer.

A still further object of the invention is the provision of a clinical thermometer in which one face thereof is ground away for a predetermined distance thereby rendering an opaque surface on the body of the thermometer distinguishable from another portion thereof, thus, in this manner, giving the body at one face thereof the appearance of two visually distinguishable fields and also to partially conceal the mercurial thread when passing through one field into the other, thereby assuring accuracy in reading the thermometer, for instantly ascertaining temperature within one of said fields.

A still further object of the invention is the provision of a thermometer in which the scale face thereof will be coated with a colored glass material the same being extended throughout the entire area of the fever degree scale and a portion of said glass material for a given area being ground away to present in the scale face of the thermometer two distinct visable fields for assuring apt reading of fever temperature.

In the drawing, accompanying and forming a part of this specification, is illustrated the preferred forms of embodiment of the invention, which should enable those skilled in the art to carry the invention into practice, and will be set forth at length in the following detail description, while the novelty of the invention will be pointed out in the claim hereunto appended.

In the drawing:—Figure 1 is an enlarged plan view of a clinical thermometer constructed in accordance with the invention and having the usual fever temperature scale thereon. Fig. 2 is a similar view showing a slight modification. Fig. 3 is a similar view showing a still further modification. Fig. 4 is a sectional view on the line 4—4 of Fig. 1. Fig. 5 is a sectional view on the line 5—5 of Fig. 1.

Similar reference characters indicate corresponding parts throughout the several views in the drawing.

Referring to the drawing by numerals, the clinical thermometer comprises a prismatic body 5, preferably constructed from glass, the same being of any desired length and is provided at one end with a contracted elongated bulb 6 containing a suitable pocket in which is received a quantity of mercury 7, the same being adapted to work in a thread-like manner through a central bore 8 extending longitudinally through the body 5 and terminating spaced from the opposite end thereof. The body 5 of the thermometer is rounded at one of its longitudinal edges so as to form a lens surface thereby enabling the mercury thread when traveling through the bore 8 in the body to be visible to the naked eye of a person.

In fever thermometers the thread-like mercury running through the body thereof is of such fine caliber that the reading of the thermometer has been a source of inconvenience and often results in annoyance, and more serious of all in inaccurate reading of the fever temperature, so that it requires a person of considerable experience in the handling of such thermometers to determine the extent of the mercury thread in the body of the same. Therefore, it is the purpose of this invention to relieve such inconvenience and annoyance thereby enabling the apt and accurate reading of the fever temperature by reason of magnifying the mercurial thread when traveling through a portion of the body indicative of supernormal fever temperature, in contra-distinction to the subnormal field thereof. As usual in the body 5 of the thermometer placed in one face thereof is a series of indicator marks forming a graduated scale 9, the same being laid out in degrees ranging for instance, from 92 degrees to 110 degrees. This scale is further subdivided by indicia, preferably numerals, each denoting two point degrees throughout the length of the scale. The scale is still further subdivided by an arrow 10, the latter being positioned in alinement with the fever degree point subdividing said scale at one side thereof into a subnormal field and at the other side thereof into an abnormal field or supernormal field. The abnormal or supernormal field is covered by means of a transparent colored glass strip 11, the strip being applied to the body 5 in any desirable manner so that the same will become an integral part thereof on one face of the thermometer body, the shade of the strip being accomplished by impregnating in any suitable manner a coloring matter. The colored glass strip 11 is initially applied throughout the extent of both fields on one face of the body 5 and thereafter the portion of the strip 11 extended within the subnormal field is obliterated by removing the same as by etching, grinding or otherwise, as indicated at 12, thereby producing an opaque portion which extends throughout the subnormal field to the arrow point 10 and serves to partly obscure the mercurial thread as it gradually rises within the bore 8 of the body 5 of the thermometer.

The strip 11 is applied the whole length of the tube from which the body of the thermometer is made, and then the portion covering the subnormal field of the scale is removed. It will be pointed out that it would seem more desirable to apply it at first only to the supernormal field of the scale on the body of the thermometer, but attention will be directed to the fact that the only possible way of correctly applying the strip is to form the same on the tube when being formed, the tube being of considerable length, because it would be impossible to apply the strip after the tube has been cut in the proper length to produce the thermometer.

In Fig. 2 there is shown a slight modification of thermometer in which the color strip 13 is disposed on one face of the body 5 opposite the face bearing the same as shown in Fig. 1, the said strip being coextensive with the abnormal or supernormal field, and in this instance the subnormal field is opaque by reason of the removal of the colored strip from said field. It will be seen that by the colored glass supernormal field and the opaque glass subnormal field, the user of the thermometer can observe at a glance the fever temperature record by the thermometer.

In Fig. 3 there is shown a still further modification in which a colored strip 14 is applied on adjacent faces of the body 5 on opposite sides of an axial line, namely the mercurial thread between the lowest degree of fever point and the highest degree thereof, or in other words coextensive with the abnormal or supernormal field on the scale of said body, the body 5 of the thermometer being provided with an opaque surface or portion 15 by grinding, etching or otherwise removing the said colored strip within the subnormal field of the said scale thereon so that that portion of the mercurial thread below the fever point of the scale is partially obscured.

By constructing a thermometer in the manner as heretofore stated it enables the same to be manufactured at a minimum cost and will serve the purposes for which it is intended in a most effective manner.

From the foregoing description, taken in connection with the accompanying drawings, it is thought that the construction and operation of the invention will be clearly understood, and therefore a more extended explanation has been omitted.

What is claimed is:—

A clinical thermometer comprising a body having a mercurial thread confined therein and movable axially for substantially the extent thereof, a raised colored surface formed on the body of the thermometer and coextensive with a portion of the course of the mercurial thread, the said body being etched to form an opaque surface extending from one terminal of the raised surface to a given point on the body in an axial direction of the mercurial thread, thereby presenting an independent distinguishable field with respect to the raised surface, said field obliterating a portion of the width of the mercurial thread.

In testimony whereof I affixed my signature in presence of two witnesses.

CHARLES HENRY DIETZ.

Witnesses:
F. J. CARTALL,
X. C. BUENTE.

Copies of this patent may be obtained for five cents each, by addressing the "Commissioner of Patents, Washington, D. C."